(No Model.)
H. R. BUTTERFIELD.
MACHINE FOR FORMING PAILS FROM PAPER PULP.
No. 335,055. Patented Jan. 26, 1886.
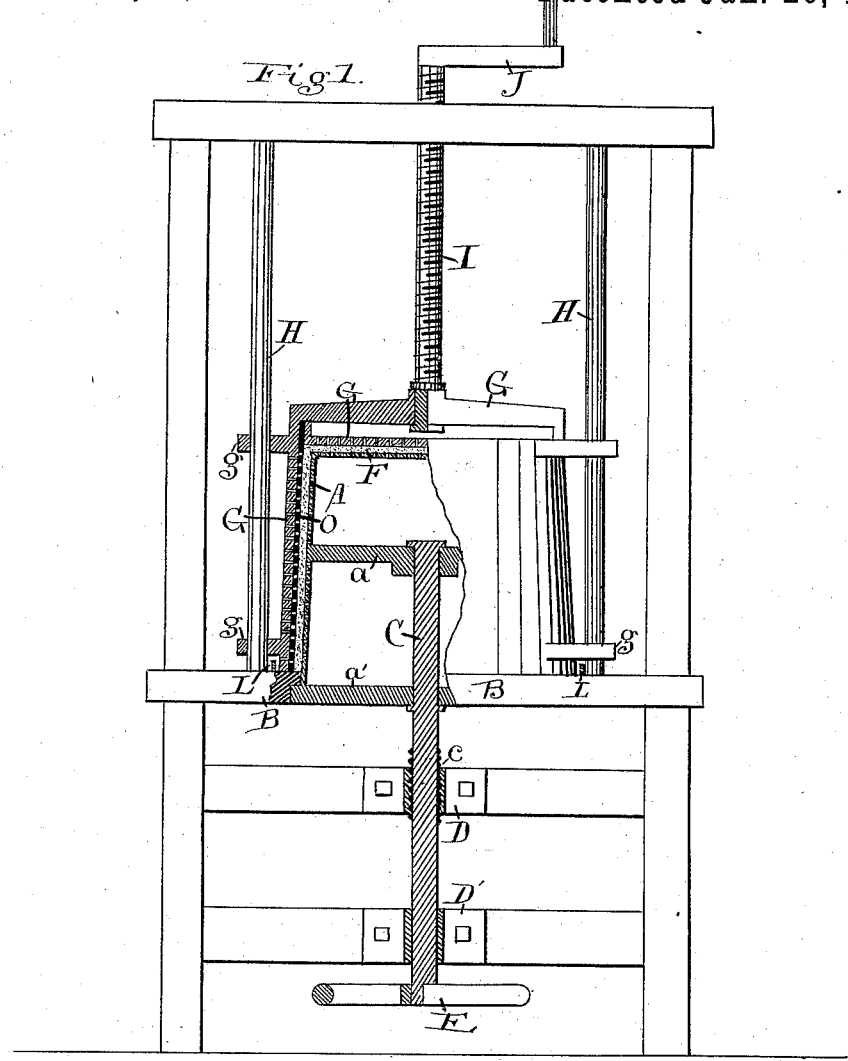
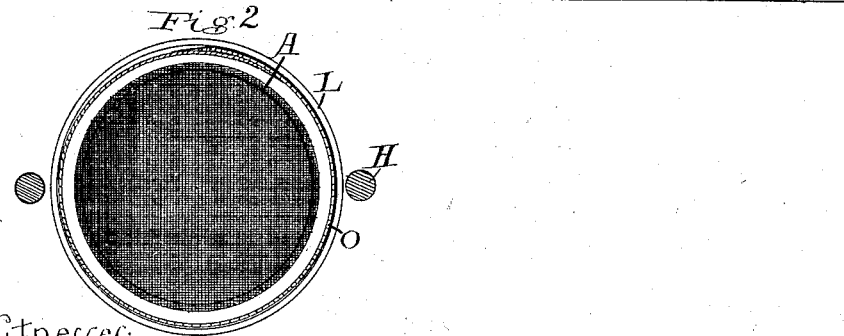
Witnesses:
Geo. N. Moore
C. Drummond
Inventor:
Henry R. Butterfield
by S. N. Bates his atty.

United States Patent Office.

HENRY R. BUTTERFIELD, OF WATERVILLE, MAINE.

MACHINE FOR FORMING PAILS FROM PAPER-PULP.

SPECIFICATION forming part of Letters Patent No. 335,055, dated January 26, 1886.

Application filed October 24, 1885. Serial No. 180,800. (No model.)

*To all whom it may concern:*

Be it known that I, HENRY R. BUTTERFIELD, a citizen of the United States, residing at Waterville, in the county of Kennebec and State of Maine, have invented certain new and useful Improvements in Machines for Forming Pails from Paper-Pulp; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to devise a machine by which pails and other articles of similar shape may be formed from paper-pulp, and which shall form the said articles with the sides and bottom in one piece, the outside and inside surface of the pail or other article being smoothly finished when it comes from the machine.

I am aware that machines have been used for forming such articles in one piece by the use of rubber bags, pressing the articles onto a porous mold both from the inside of such mold and also from the outside; but by either one of these processes the result is to leave either the inside or outside surface of the article, as the case may be, with a more or less rough or uneven finish. Another objectionable feature is, that by these machines the thickness of the articles cannot be exactly regulated.

In my machine I form the article on the outside of an inverted porous mold, pressing the pulp onto the sides by means of an overlapping jacket of flexible metal and on the bottom by a descending head or plunger, around which closes the upper edge of the jacket above alluded to.

In the drawings, elevation and vertical section, Figure 1 is top view of former. Fig. 2 is a cross-section of Fig. 1.

B is the bed-piece of the machine, supported by a suitable frame-work. Fitting into a circular opening in this bed-piece is the inverted porous mold or former A. The mold A is raised and lowered by the screw C, operated by the wheel E. When screwed up as far as it will go, the mold A makes a tight joint with the bed-piece B.

O is a band of thin finely-perforated metal surrounding the mold A, its edges overlapping. The lower edge of this band or jacket rests on the bed-piece B, and the upper edge rises slightly above the top of the mold A. The band O is made of some tempered material, and when fully expanded it forms an annular space around the outside surface of the mold A. The flange or stop L keeps the band O in position when the latter is expanded.

G is a female die or plunger moved vertically on the guides H H by means of the screw I, operated by crank J. The lower end of die G is open, while the side and top walls are composed of perforated metal. The head $g$ projects below the upper surface of cylinder G. When the band O is fully expanded, it must be of sufficiently small diameter to be received by the open end of the female die. The relative sizes of the female die, the band O, and the former will be made evident as I explain the operation of the machine.

Previous to forming a pail, the female die is raised above the top of former A by the screw I. The band O, then expanded, forms an annular space about the former A, said space being open at the top. This space is now filled with pulp, mixed with water, up to the top of band O, the pulp completely covering the form A. The female die G is now lowered, its lower end receiving the upper edge of the band O. As it descends, the tapering form of the die, it being smallest at the top, causes the band O to contract its circumference until the head of the female die reaches the upper edge of the band O, when the band should be sufficiently contracted to fit closely about the head of the die. When this point is reached, the contraction of the band will have forced the inclosed pulp against the sides of the former, the water passing through the sides of the former and through the perforations of the band O. The head of the female die, as it passes downward inclosed by the band O, will compress the pulp which has formed on the top of the former, and which constitutes, when complete, the bottom of the pail. When the lower edge of the female die reaches the bed-piece, the head and sides of the female die should have formed and compressed the outside of the pail to its exact shape. The female die is now raised from the former, and the band O immediately expands away from the surface of the formed pail. The former A is now started downward, loosening the pail which has been formed on its surface, the lower edge of said pail resting on the bed-piece B.

The means shown for raising and lowering the female die, and also the former, may be changed at will, as they are no part of the invention.

After the pail is formed, the perforated band O may be removed, and several unperforated bands, one inside the other, may be placed over the pail, and the cylinder G brought down, thus compressing the side walls of the pail. These bands are of the same shape as band O, and are placed on successively, bringing down the cylinder each time.

I claim—

1. In a machine for forming pails and other tapering articles from paper-pulp, the porous former A, surrounded by the contractible and expansible perforated metal band O, combined with the female die or cylinder G, with its projecting head g, and means for raising and lowering the same, substantially as and for the purpose set forth.

2. In a machine for forming pails and other tapering articles from paper-pulp, a porous inverted former encircled by an overlapping perforated and tempered metal band, between which and the former the pulp is introduced, and which is collapsed about the former by the descending open-bottomed cylinder, carrying a head adapted to forming the bottom of the pail.

3. In a machine for forming pails from paper-pulp, the annular band having overlapping ends for compressing the formed pail, in combination with a cylinder which shuts down over them and presses them against the sides of the pail, substantially as described.

In testimony whereof I affix my signature in presence of two witnesses.

HENRY R. BUTTERFIELD.

Witnesses:
S. W. BATES,
GEO. W. MOORE.